United States Patent
Hsu

(10) Patent No.: US 7,052,195 B2
(45) Date of Patent: May 30, 2006

(54) FOLDABLE INPUT APPARATUS

(75) Inventor: Chien-Shih Hsu, Taipei (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/844,900

(22) Filed: May 12, 2004

(65) Prior Publication Data

US 2004/0228668 A1 Nov. 18, 2004

(30) Foreign Application Priority Data

May 12, 2003 (TW) .............................. 92112802 A

(51) Int. Cl.
B41J 5/14 (2006.01)

(52) U.S. Cl. ...................... 400/472; 400/691

(58) Field of Classification Search ................ 400/472, 400/492, 473, 495, 489, 691; 341/21, 22; 361/680; 235/145 R; 200/5 R
See application file for complete search history.

(56) References Cited

U.S. PATENT DOCUMENTS 3,940,758 A * 2/1976 Margolin ..................... 345/169
5,457,453 A * 10/1995 Chiu et al. ..................... 341/22
5,574,481 A * 11/1996 Lee .............................. 345/168
5,653,543 A * 8/1997 Abe ............................. 400/489
6,068,417 A * 5/2000 Butler .......................... 400/492
6,151,012 A * 11/2000 Bullister ...................... 345/168
6,256,017 B1 * 7/2001 Bullister ...................... 345/168
6,547,463 B1 * 4/2003 Loo ............................. 400/472
6,575,647 B1 * 6/2003 Daniel ......................... 400/472
6,714,403 B1 * 3/2004 Furuki et al. ............... 361/680
6,798,649 B1 * 9/2004 Olodort et al. ............. 361/683
6,808,326 B1 * 10/2004 Klimke et al. .............. 400/691
6,877,919 B1 * 4/2005 Sitalasai et al. ............ 400/472

* cited by examiner

Primary Examiner—Anthony H. Nguyen
(74) Attorney, Agent, or Firm—Snell & Wilmer L.L.P.

(57) ABSTRACT

A foldable input apparatus for inputting data to an electronic device is provided. The foldable input apparatus includes a connection part, a first input part, a second input part, a first housing and a second housing. The connection part includes a first pivot, a second pivot, a third pivot and a fourth pivot. The first housing pivotally connects to the first pivot, and the second housing pivotally connects to the third pivot. The first input part pivotally connects to the second pivot, and the second input part pivotally connects to the fourth pivot. The first input part and the first housing rotate with respect to different pivots, and so do the second input part and the second housing. Therefore, when the first input part, the first housing, the second input part and the second housing rotate with respect to the connection part, a relative position of the first input part and the first housing as well as that of the second input part and the second housing are correspondingly changed.

18 Claims, 10 Drawing Sheets

FOLDABLE INPUT APPARATUS

CROSS-REFERENCE TO RELATED APPLICATION

This application claims priority to Taiwan Patent Application No. 092112802 entitled "Foldable Keyboard", filed on May 12, 2003.

FIELD OF INVENTION

The present invention generally relates to a foldable input apparatus for inputting data to an electronic device.

BACKGROUND OF THE INVENTION

Commercial electronic devices, such as portable computers, Personal Digital Assistants (PDAs), mobile phones, etc., are developed with lightweight and smaller size to enhance portability. Accordingly, peripherals of the portable electronic devices, for example input apparatus, are also designed with reduced size or volume.

Keyboards are most commonly used external input apparatus. In order to increase portability, a "foldable keyboard" is developed. The foldable keyboard is expanded when it is used and folded when it is not used. The keyboard in a folded (closed) configuration has a size about half of that in an expanded configuration so as to increase its portability.

A conventional foldable keyboard generally includes two input parts, rotatably coupled, or further includes a connection part to connect the two input parts. However, in order to prevent interference between these two input parts when the foldable keyboard is folded, the foldable keyboard is generally designed with a gap between these two input parts when it is expanded.

To reduce the gap between these two input parts, a foldable keyboard with movable input parts is developed. When the conventional foldable keyboard is expanded, the movable input parts have to move toward each other until the gap is substantially eliminated for a better operation. Before the foldable keyboard is closed, the two movable input parts must move in opposite directions to regain the gap first so as to prevent interference.

SUMMARY OF THE INVENTION

One aspect of the present invention is to provide a foldable input apparatus for inputting data to an electronic device.

Another aspect of the present invention is to provide a foldable input apparatus selectively in a closed configuration and an open configuration resulting in corresponding change of the relative position of an inner part and an outer part.

A further aspect of the present invention is to provide a foldable input apparatus having two input parts substantially arranged in an integral configuration with minimum gap therebetween when in an open configuration. The foldable keyboard can be closed without moving the two movable input parts in opposite directions.

In a first embodiment, the present invention provides a foldable input apparatus including a connection part, a first input part, a second input part, a first housing, and a second housing. The connection part includes a first pivot, a second pivot, a third pivot, and a fourth pivot. The first pivot is distanced from the second pivot by a first vertical distance and a first horizontal distance. The third pivot is distanced from the fourth pivot by a second vertical distance and a second horizontal distance.

The first housing pivotally connects to the first pivot. The second housing pivotally connects to the third pivot. The first input part pivotally connects to the second pivot. The second input part pivotally connects to the fourth pivot. The first housing and the first input part are distanced with a first distance, and the second housing and the second input part are distanced with a second distance.

In such a configuration, the first input part and the first housing pivotally connects to different pivots. When the first input part and the first housing rotate with respect to the connection part, a relative position of the first input part and the first housing is correspondingly changed. When the first input part and the first housing are in a closed configuration, the first distance substantially equals the first horizontal distance. When the first input part and the first housing are in an open configuration, the first distance substantially equals the first vertical distance.

Furthermore, in such a configuration, the second input part and the second housing pivotally connect to different pivots respectively. When the second input part and the second housing rotate with respect to the connection part, a relative position of the second input part and the second housing is correspondingly changed. When the second input part and the second housing are in a closed configuration, the second distance substantially equals the second horizontal distance. When the second input part and the second housing are in an open configuration, the second distance substantially equals the second vertical distance.

BRIEF DESCRIPTION OF THE DRAWINGS

The foregoing aspects and many of the attendant advantages of this invention will become more readily appreciated as the same becomes better understood with reference to the following detailed description, when taken in conjunction with the accompanying drawings, wherein.

DETAILED DESCRIPTION

Figure 1A:
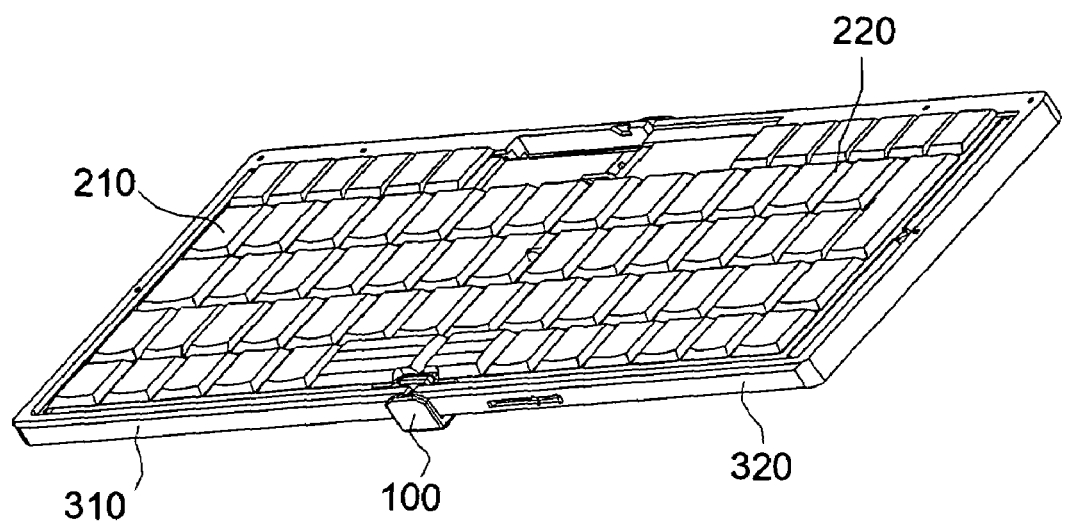
FIG. 1A illustrates a schematic view of a foldable input apparatus of the present invention in an open configuration.
Figure 1B:
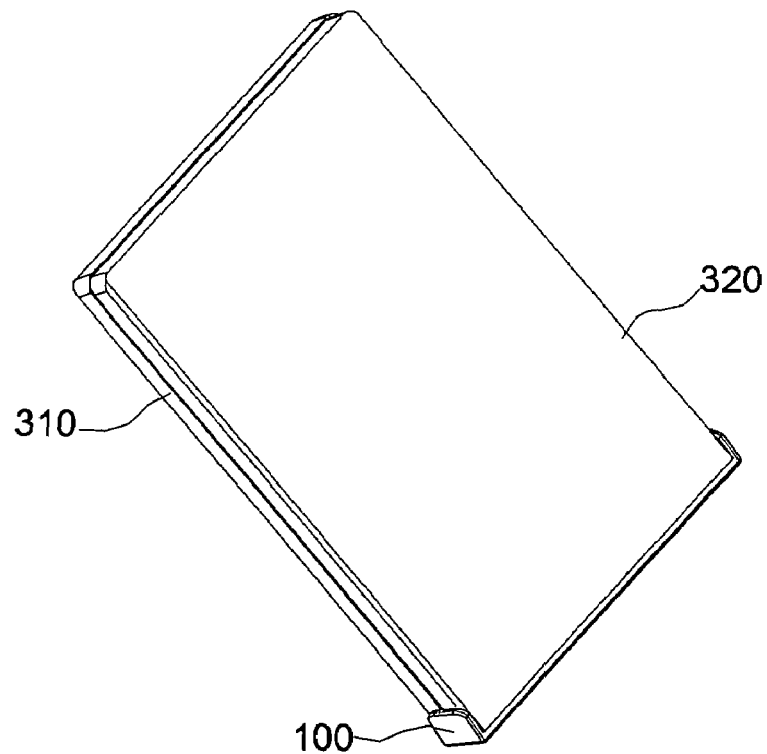
FIG. 1B illustrates a schematic view of a foldable input apparatus of the present invention in a closed configuration.

The present invention provides a foldable input apparatus for inputting data to an electronic device. The electronic device can be a Personal Digital Assistant (PDA), a mobile phone, a flat computer, or any device as appropriate. As shown in FIGS. 1A and 1B, in one embodiment of the present invention, the foldable input apparatus can be a foldable keyboard. In other embodiments, the foldable input apparatus can be a foldable touch pad, a foldable controller, the combination of a keyboard and a touch pad, and any suitable apparatus.

FIG. 1A illustrates a schematic view of the foldable input apparatus in an open configuration. The foldable apparatus can be used to connect the electronic device described above when it is in the open configuration. FIG. 1B illustrates a schematic view of the foldable input apparatus in the closed configuration. The foldable input apparatus is capable of providing its internal components or modules with protection when it is in the closed configuration.

Figure 2A:
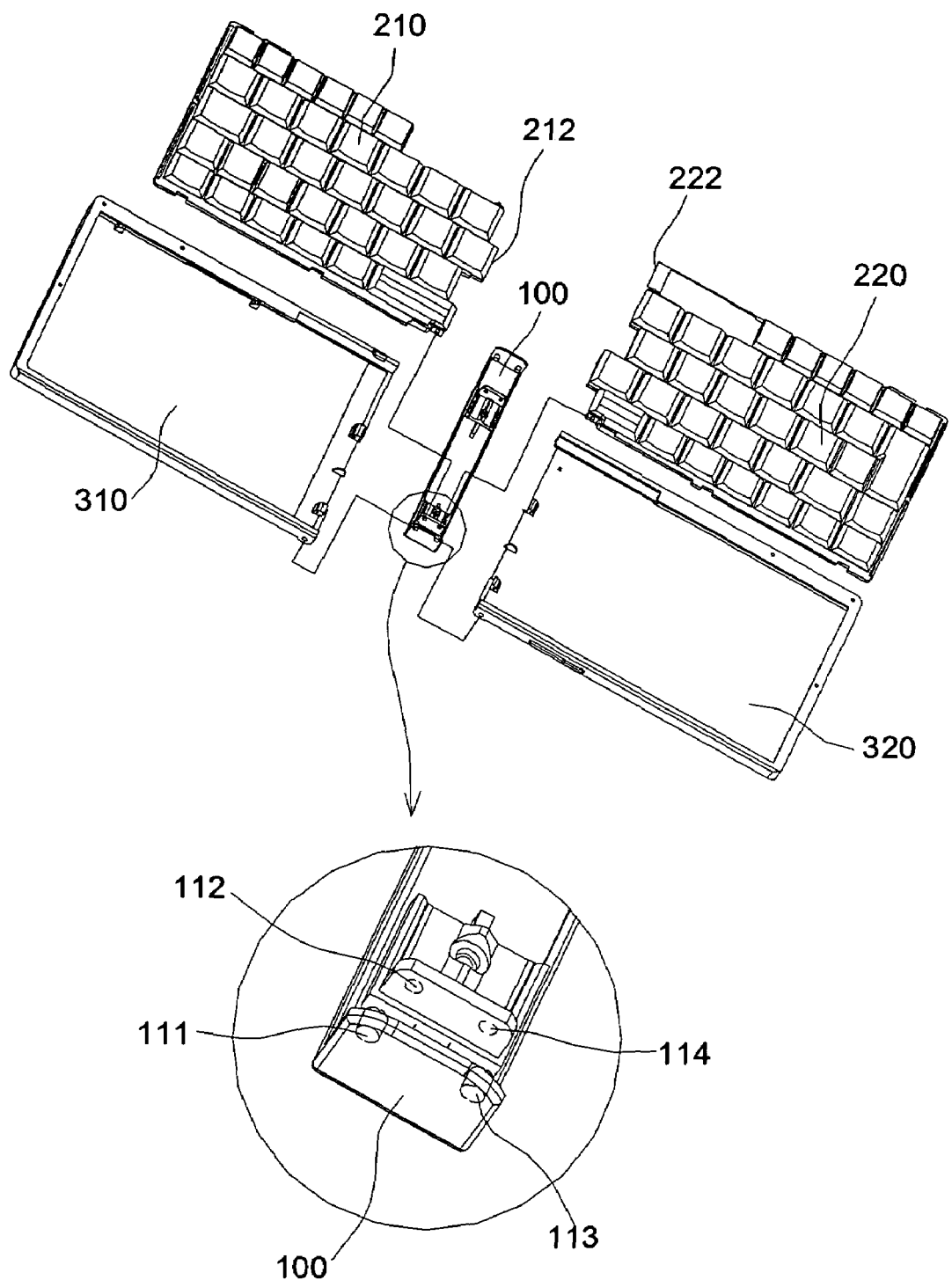
FIG. 2A illustrates an explosive view of a foldable input apparatus of the present invention.
Figure 2B:
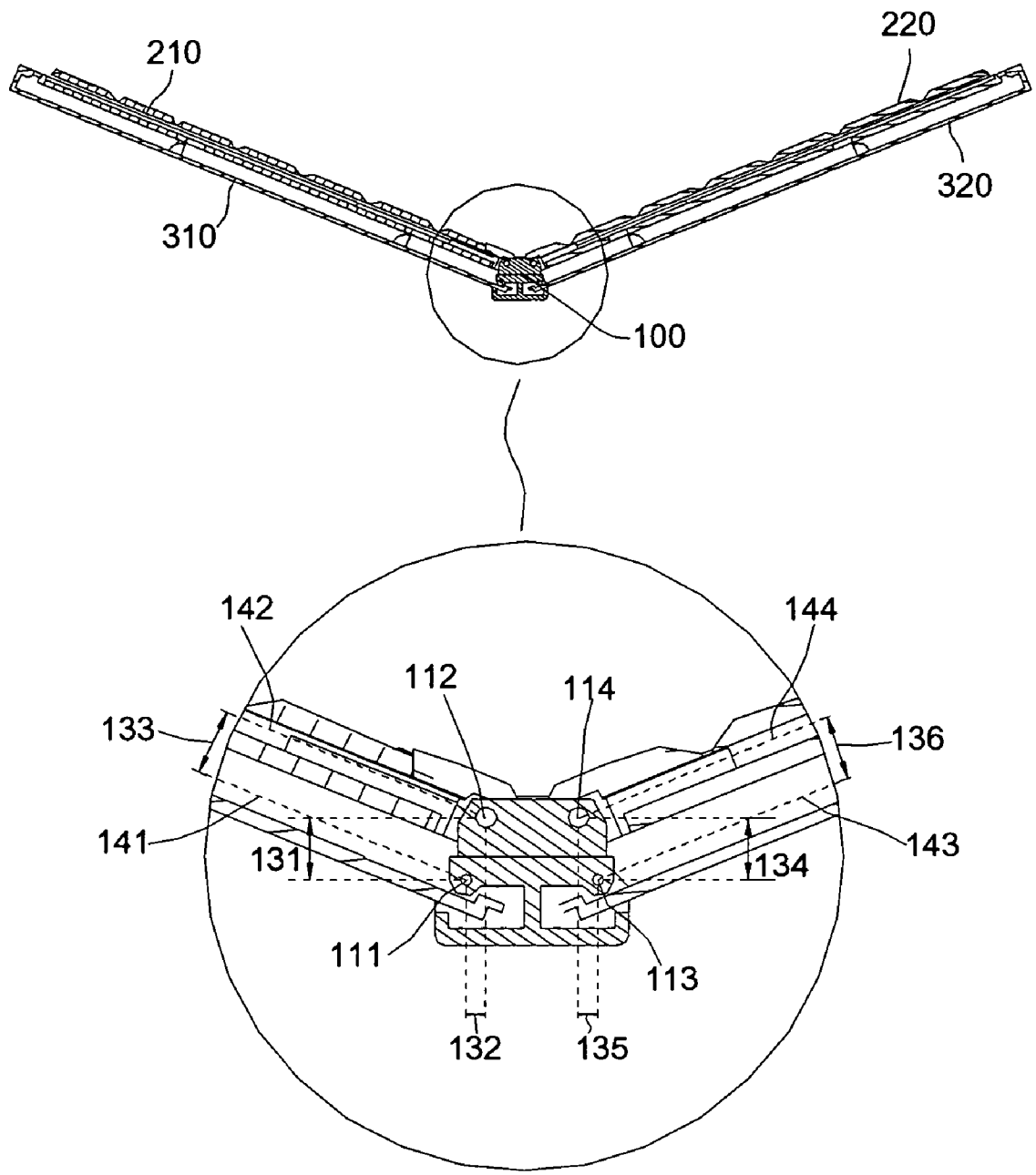
FIG. 2B illustrates a cross-sectional view of a foldable input apparatus of the present invention.

As shown in FIG. 2B, the foldable input apparatus includes a connection part 100, a first input part 210, a second input part 220, a first housing 310, and a second housing 320. As shown in FIG. 2B, the connection part 100 includes a first pivot 111 and a second pivot 112. The first pivot 111 is distanced from the second pivot 112 by a first vertical distance 131 and a first horizontal distance 132. The first vertical distance 131 is greater than the first horizontal distance 132.

The first housing 310 pivotally connects to the first pivot 111. In this embodiment, the first housing 310 utilizes a pivot connecting to the first pivot 111. Furthermore, the first housing 310 defines a first axis 141 passing through the first pivot 111.

The first input part 210 is movable with respect to the first housing 310 and disposed on the first housing 310. The first input part 210 pivotally connects to the second pivot 112. Furthermore, the first input part 210 defines a second axis 142 passing through the second pivot 112. The first axis 141 is away from the second axis 142 by a first distance 133. In this embodiment, the first input part 210 utilizes a pivot connecting to the second pivot 112. Moreover, the first input part 210 includes a protrusion (not shown), and the first housing 310 includes a guiding groove (not shown). The protrusion is slidably received in the guiding groove so that the first input part 210 is movably disposed on the first housing 310.

When the first input part 210 and the first housing 310 rotate with respect to the connection part 100, the first input part 210 and the first housing 310 are selectively in the open configuration of FIG. 1A and the closed configuration of FIG. 1B. When the first input part 210 and the first housing 310 are in the closed configuration of FIG. 1B, the first distance 133 substantially equals the first horizontal distance 132. When the first input part 210 and the first housing 310 are in the open configuration of FIG. 1A, the first distance 133 substantially equals the first vertical distance 131.

As shown in FIG. 2B, the connection part 100 further includes a third pivot 113 and a fourth pivot 114. The third pivot 113 and the fourth pivot 114 are positioned on the same side of the first pivot 111 and the second pivot 112 respectively. The third pivot 113 is distanced from the fourth pivot 114 by a second vertical distance 134 and a second horizontal distance 135. The second vertical distance 134 is greater than the second horizontal distance 135. In this embodiment, the second vertical distance 134 equals the first vertical distance 131, and the second horizontal distance 135 equals the first horizontal distance 132.

The second housing 320 pivotally connects to the third pivot 113. In this embodiment, the second housing 320 utilizes a pivot connecting to the third pivot 113. Furthermore, the second housing 320 defines a third axis 143 passing through the third pivot 113.

The second input part 220 is movable with respect to the second housing 320 and disposed on the second housing. The second input part 220 pivotally connects to the fourth pivot 114. Furthermore, the second input part 220 defines a fourth axis 144 passing through the fourth pivot 114. The third axis 143 is away from the fourth axis 144 by a second distance 136. In this embodiment, the second input part 220 utilizes a pivot connecting to the fourth pivot 114. Furthermore, the second input part 220 includes a protrusion (not shown), and the second housing 320 includes a guiding groove (not shown). The protrusion is slidably received in the guiding groove so that the second input part 220 is movably disposed on the second housing 320.

When the second input part 220 and the second housing 320 rotate with respect to the connection part 100, the second input part 220 and the second housing 320 are selectively in the open configuration of FIG. 1A and the closed configuration of FIG. 1B. When the second input part 220 and the second housing 320 are in the closed configuration of FIG. 1B, the second distance 136 substantially equals the second horizontal distance 135. When the second input part 220 and the second housing 320 are in the open configuration of FIG. 1A, the second distance 136 substantially equals the second vertical distance 134.

In the embodiments of FIGS. 2A and 2B, the first input part 210 is substantially accommodated in the first housing 310. In other words, the first housing 310 covers the first input part 210 from bottom up. Furthermore, the first input part 210 is substantially parallel to the first housing 310. However, in an alternative embodiment, the first input part 210 may not be covered from bottom up by the first housing 31, and the first input part 210 and the first housing 310 may form an angle.

In the embodiments of FIGS. 2A and 2B, the second input part 220 is substantially accommodated in the second housing 320. In other words, the second housing 320 covers the second input part 220 from bottom up. Furthermore, the second input part 220 is substantially parallel to the second housing 320. However, in an alternative embodiment, the second input part 220 may not be covered from bottom up by the second housing 320, and the second input part 220 and the second housing 320 may form an angle.

In a preferred embodiment, each of the first input part 210 and the second input part 220 may include a key switch module. The key switch module includes a set of keys and a circuit module. However, in an alternative embodiment, the first input part 210 or the second input part 220 may include only the set of keys, and the corresponding circuit module is disposed between the first input part 210 and the first housing 310 or between the second input part 220 and the second housing 320. Moreover, the first input part 210 or the second input part 220 may include a touch pad module, or other input module as appropriate.

Figure 3A:
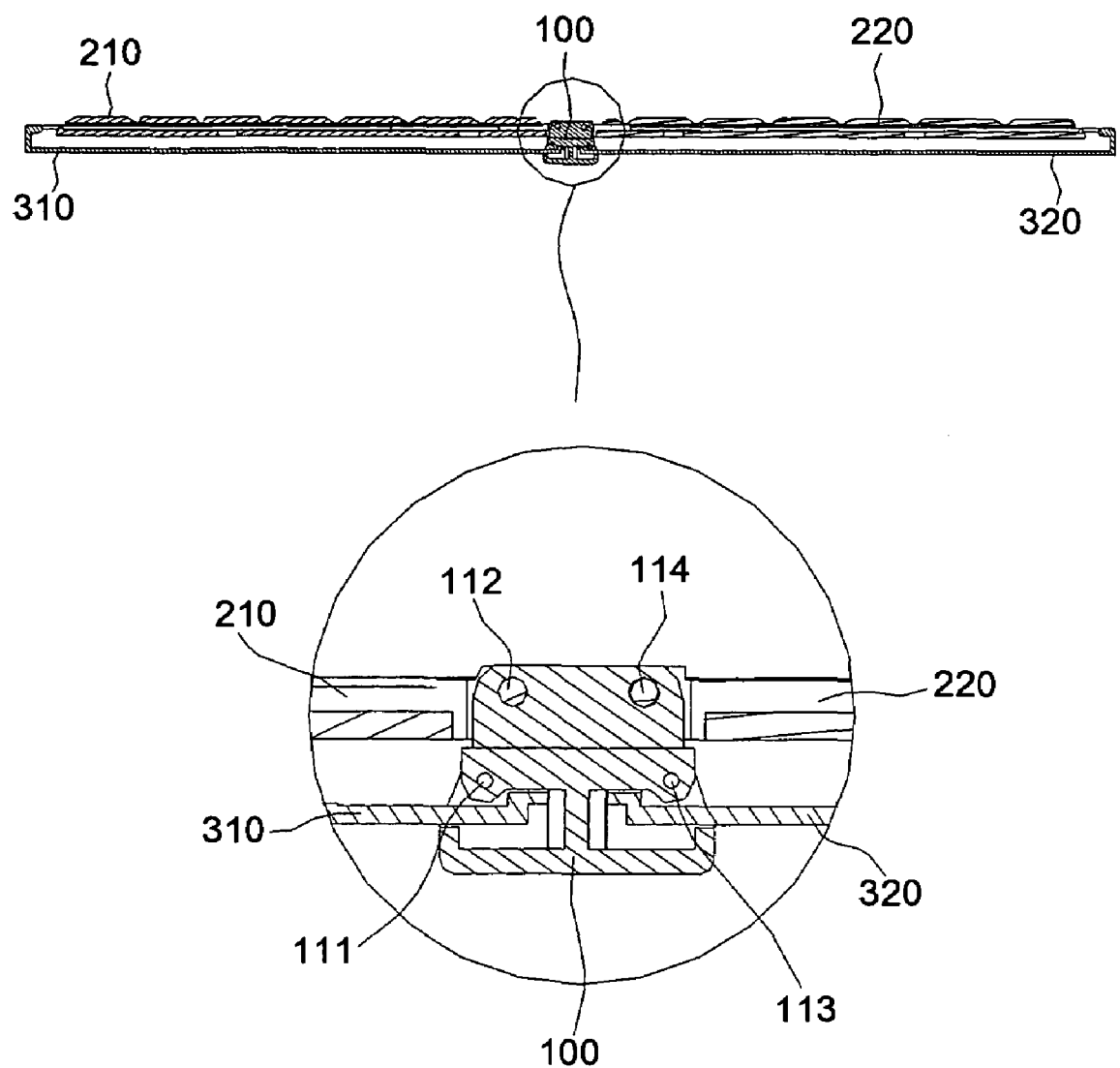
FIG. 3A illustrates a cross-sectional view of FIG. 1A.
Figure 3B:
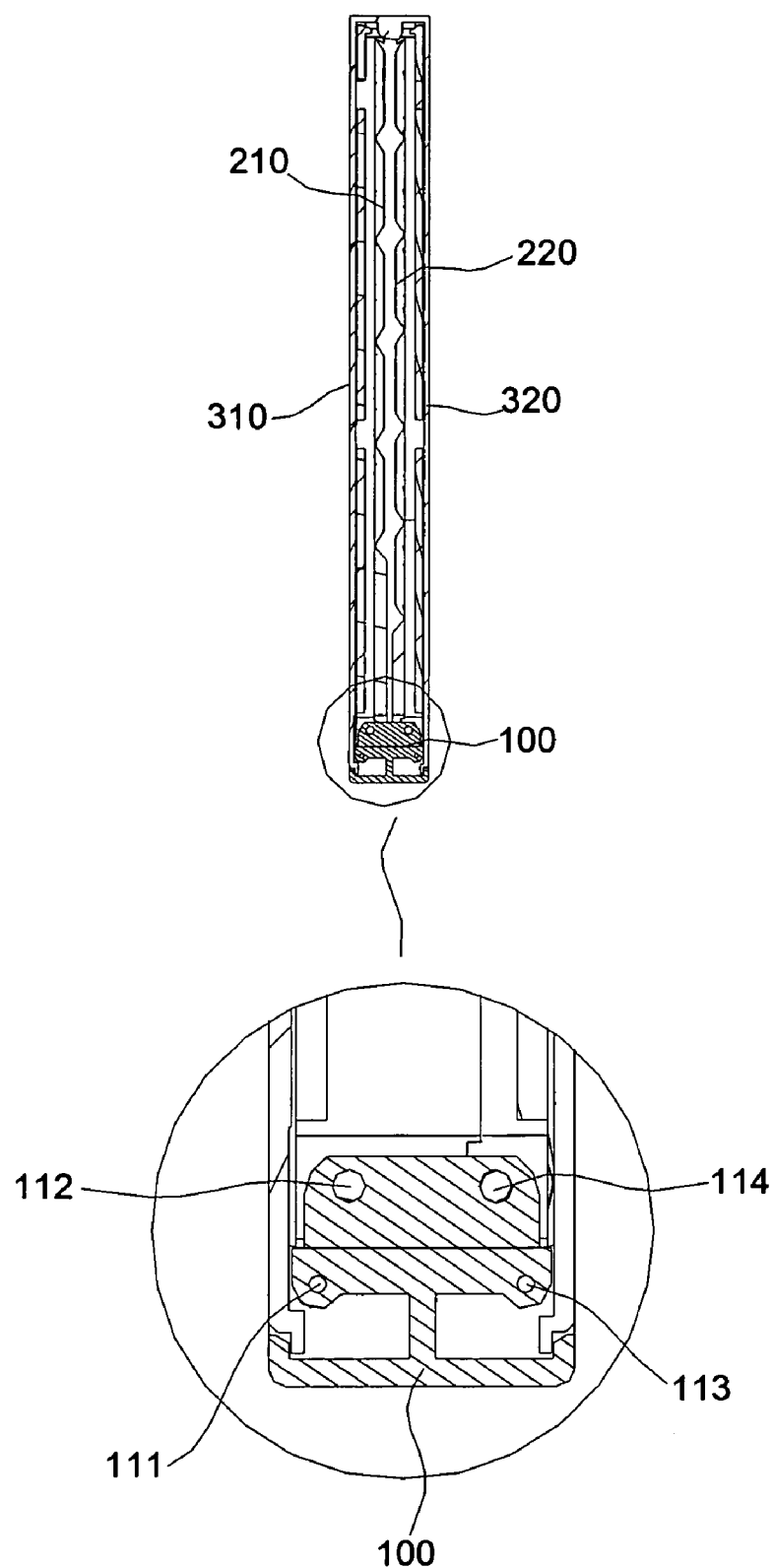
FIG. 3B illustrates a cross-sectional view of FIG. 1B.

FIGS. 3A and 3B illustrate cross-sectional views of the foldable input apparatus in the open configuration and the closed configuration respectively. When the first input part 210 and the first housing 310 rotate with respect to the connection part 100, a relative position of the first input part 210 and the first housing 310 is correspondingly changed. The cause of the change of the relative position is that the first input part 210 and the first housing 310 pivotally connect to different pivots respectively. In this embodiment, the change includes that the relative position of the first part 210 and the first housing 310 perpendicular to the first input part and the relative position of the first part 210 and the first housing 310 parallel to the first input part 210. Comparing FIG. 3A with FIG. 3B, it is noted that when the configuration of the foldable input apparatus is changed, the first distance 133 between the first input part 210 and the first housing 310 is correspondingly changed. Furthermore, the first input part 210 and the first housing 310 also induce a relative lateral shift in the direction parallel to the first input part 210 during the change of configuration. Moreover, the change of a relative position of the second input part 220 and the second housing 320 is similar to that of the first input part 210 and the first housing 310 and is not elaborated hereinafter.

In the embodiments of FIGS. 3A and 3B, the first input part 210 and the first housing 310 move in response to each other. In other words, when the first input part 210 rotates with respect to the connection part 100, the first housing 310 rotates correspondingly. Similarly, when the first housing 310 rotates with respect to the connection part 100, the first input part 210 rotates correspondingly. In a preferred embodiment, though the relative position of the first input part 210 and the first housing 310 may be changed as the first input part 210 and the first housing 310 rotate with respect to the connection part 100, the first input part 210 may remain parallel to the first housing 310. Similarly, the second input part 220 and the second housing 320 may move in response to each other as the first input part 210 and the first housing 310 do.

In a preferred embodiment, the first input part 210 movably couples to the first housing 310 to achieve the movement as described above. For example, a shaft (not shown) may be used to couple the first input part 210 with the first housing 310. Alternatively, the first input part 210 may be provided with a protrusion on its outer side, and the first housing 310 may be provided with a guiding groove in its inner side. The protrusion is received in the guiding groove so that the first input part 210 movably couples to the first housing 310. Similarly, the second input part 220 and second housing 320 may have the same feature of the protrusion and the guiding groove.

Figure 4:
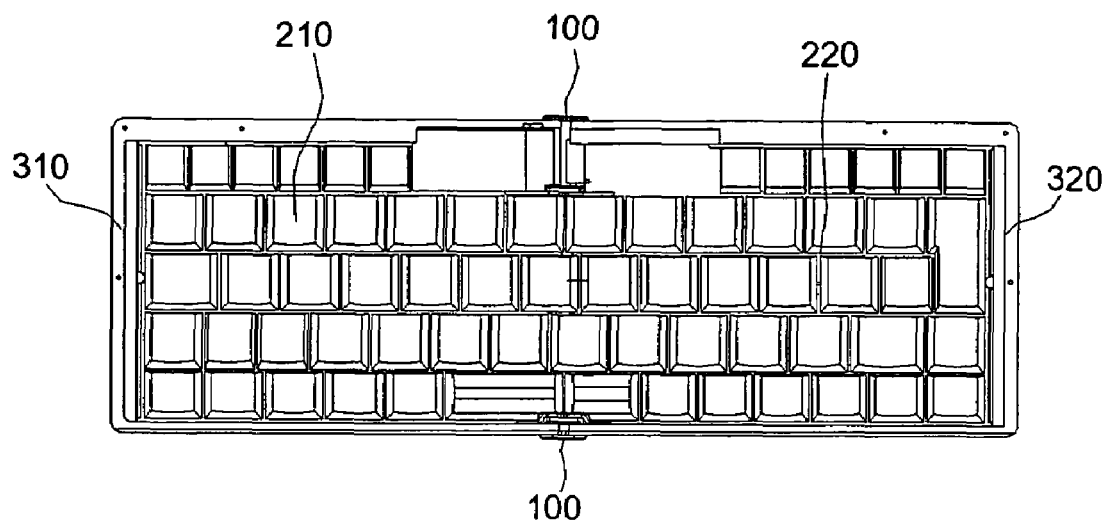
FIG. 4 illustrates a top view of a foldable input apparatus of the present invention.

As shown in FIG. 3A, when the first input part 210, the first housing 310, the second input part 220 and the second housing 320 are in the open configuration respectively, the first input part 210 and the second input part 220 are substantially coplanar. However, in an alternative embodiment, the first input part 210 and the second input part 220 may form an angle. Moreover, as shown in FIG. 4, when the first input part 210 and the second input part 220 rotate to the open configuration respectively, edges of the first input part 210 and the second input part 220 are complementary to each other. For example, as shown in FIGS. 2A and 4, the first input part 210 has a zigzag edge 212, and the second input part 220 also has a zigzag edge 222 which substantially complements to the zigzag edge 212 when in the open configuration. However, in an alternative embodiment, the first input part 210 may have a linear edge, and the second input part 220 may also have a linear edge. As shown in FIG. 3B, when the first input part 210, the first housing 310, the second input part 220, and the second housing 320 are in the closed configuration respectively, the first input part 210 partially overlaps the second input part 220 and resides between the first housing 310 and the second housing 320.

Figure 5:
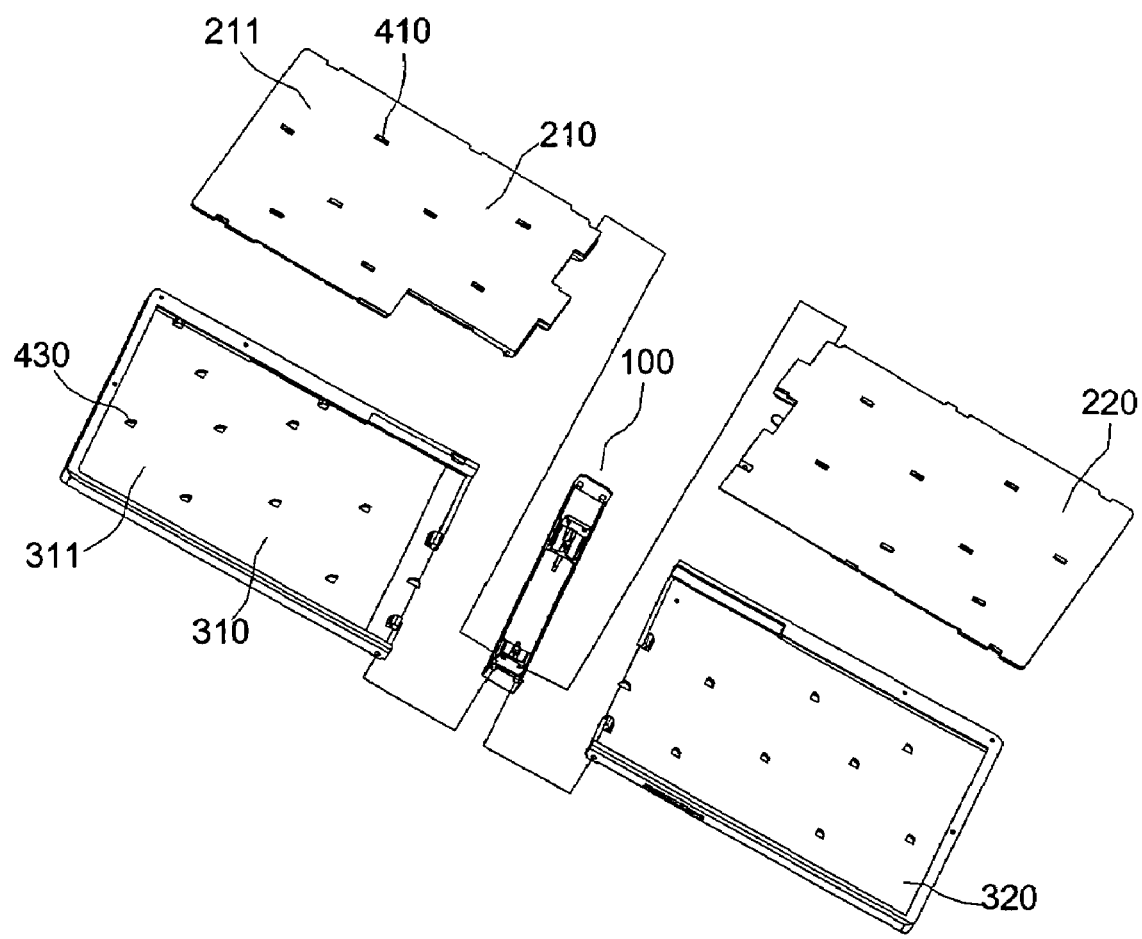
FIG. 5 illustrates an explosive view of a foldable input apparatus in another embodiment of the present invention.
Figure 6A:
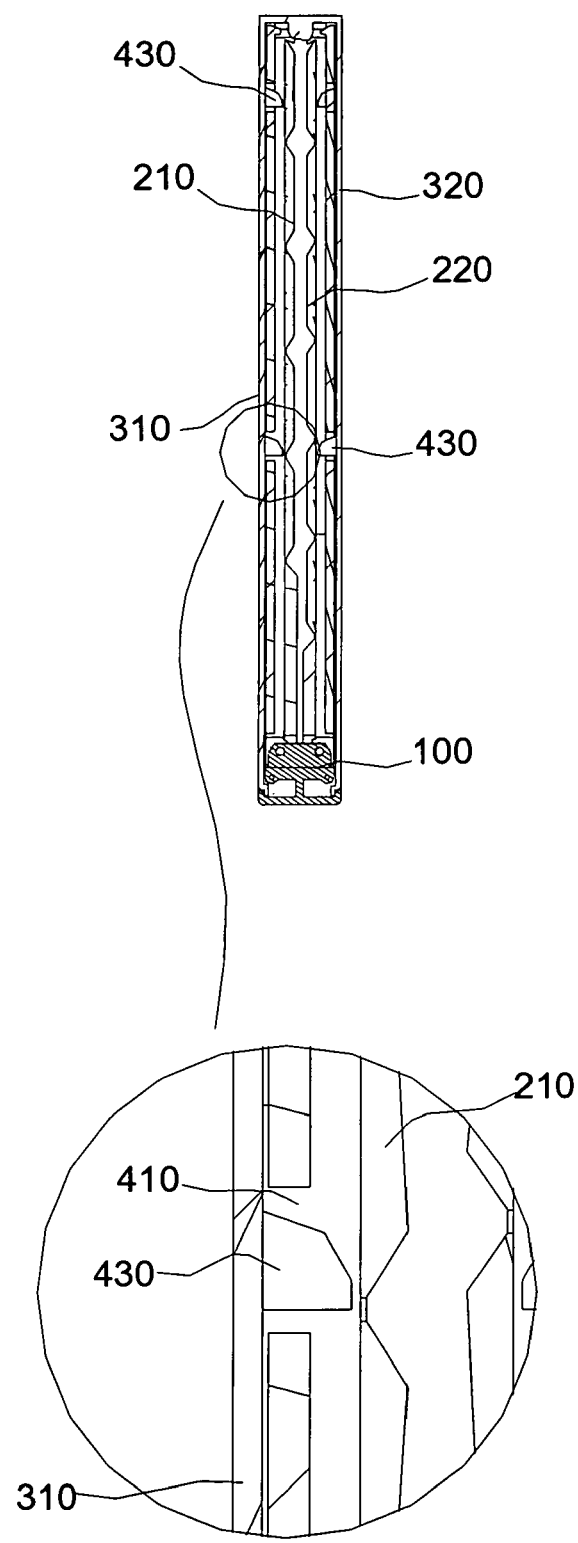
FIG. 6A illustrates a schematic view of FIG. 5 in a closed configuration.
Figure 6B:
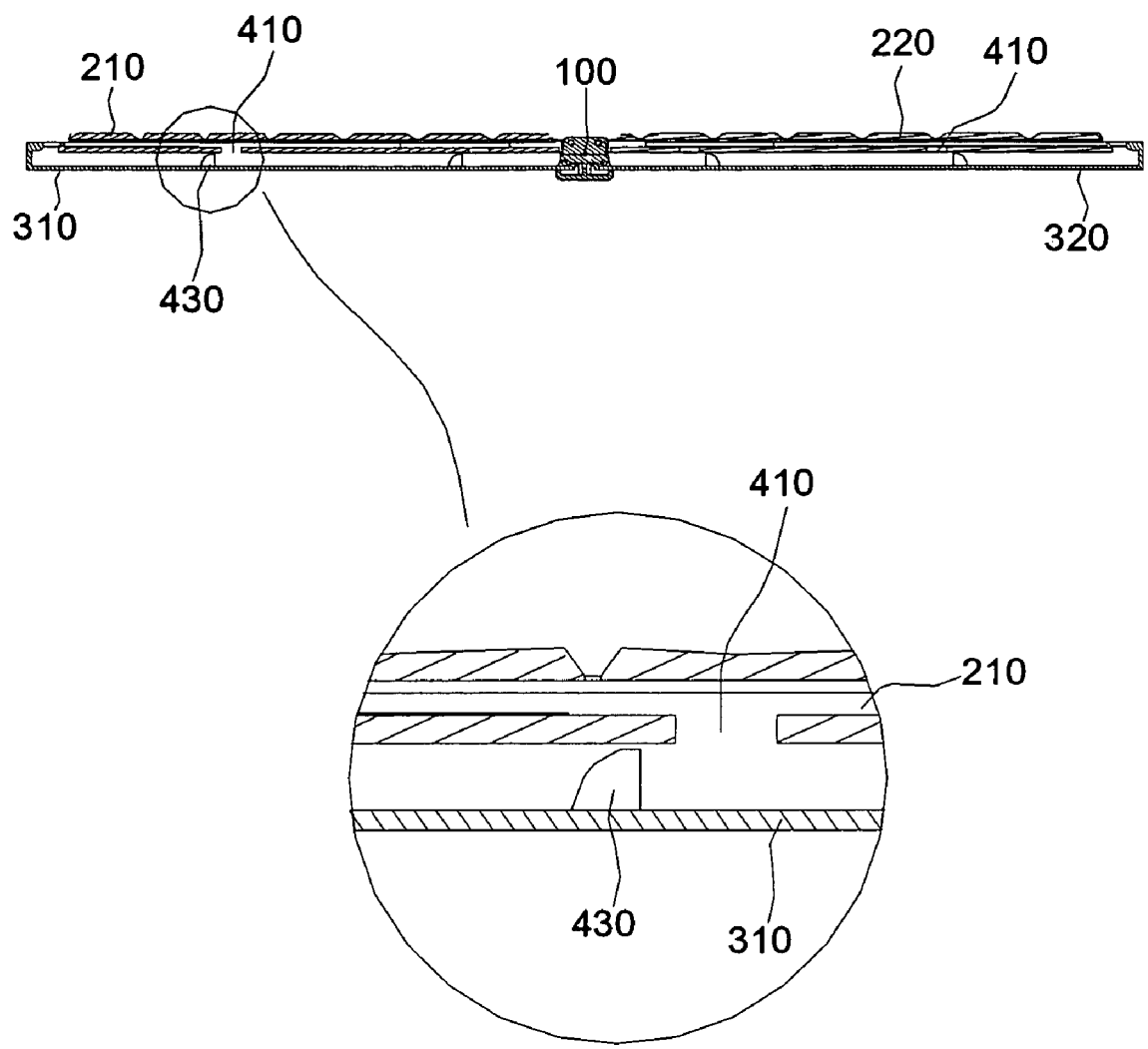
FIG. 6B illustrates a schematic view of FIG. 5 in an open configuration.

FIG. 5 illustrates an explosive view of another embodiment of the present invention. As shown in FIG. 5, the first input part 210 has a bottom surface 211 with at least one hole 410 therein, and the first housing 310 has an upper surface 311 with at least one protrusion 430 thereon. As shown in FIG. 6A, when the first input part 210 and the first housing 310 are in the closed configuration, each of the protrusions 430 is accommodated in the corresponding hole 410 so as to allow the reduction of the distance between the first input part 210 and the first housing 310. As shown in FIG. 6B, when the first input part 210 and the first housing 310 are in the open configuration, each of the protrusion 430 escapes from the corresponding hole 410 touching against the bottom surface 211 of the first input part 210. When a user operates the first input part 210, the protrusion 430 supports the first input part 210 to prevent the first input part 210 from sinking. Moreover, in an alternative embodiment, the first input part 210 may include protrusions 430 on its bottom surface 211, and the first housing 310 has holes 410 in its upper surface 311. Furthermore, the second input part 220 and the second housing 320 may have a feature similar to the protrusion 430 and the hole 410 as described above.

Figure 7:
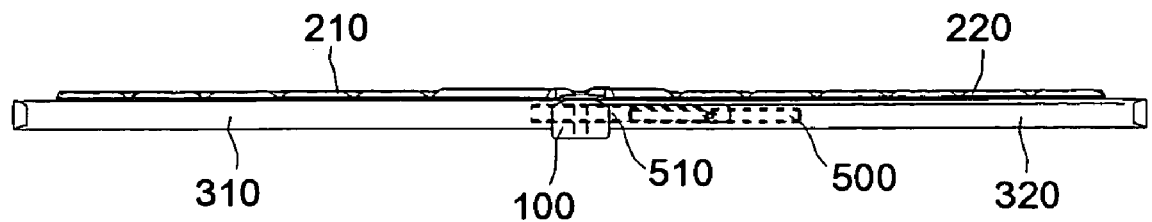
FIG. 7 illustrates a schematic view of a foldable input device with a locking device in another embodiment of the present invention.

The foldable input apparatus further includes a locking device 500. When the first housing 310 and the second housing 320 are in the open configuration respectively, the locking device 500 maintains a relative position of the first housing 310 and the second housing 320 unchanged. As shown in FIG. 7, the locking device 500 includes a latch 510, which movably connects to the second housing 320. When the first housing 310 and the second housing 320 are in the open configuration respectively, the latch 510 moves to engage with the second housing 320 so that the first housing 310 cannot rotate with respect to the second housing 320. However, in an alternative embodiment, the locking device 500 may include a hook or other devices as appropriate. In another embodiment, when the first housing 310 and the second housing 320 are in the closed configuration respectively, the locking device 500 may also maintain the relative position of the first housing 310 and the second housing 320 unchanged.

Figure 8A:
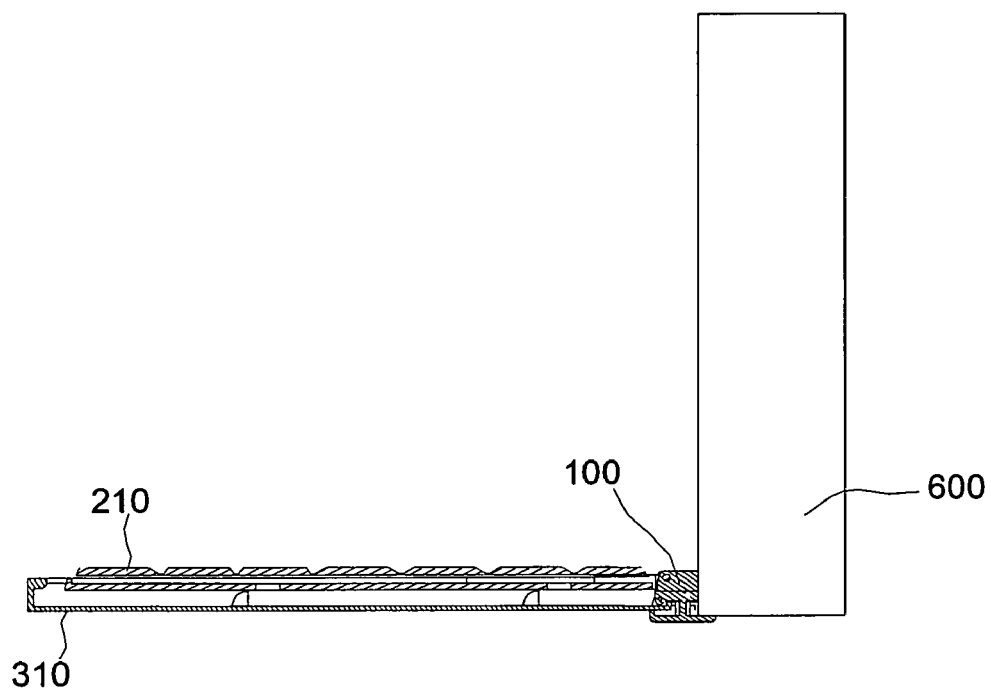
FIG. 8A illustrates a schematic view of a foldable input apparatus in an open configuration in another embodiment of the present invention.
Figure 8B:
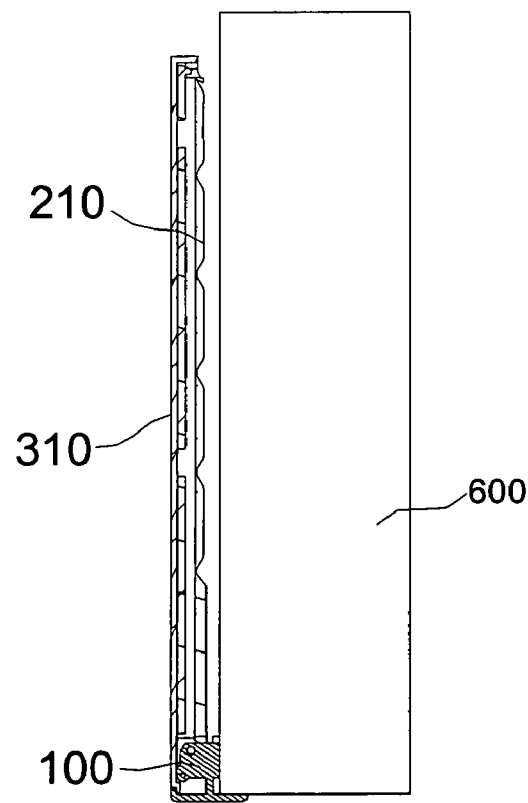
FIG. 8B illustrates a schematic view of a foldable input apparatus in a closed configuration in another embodiment of the present invention.

FIGS. 8A and 8B illustrate another embodiment of the present invention in an open configuration and a closed configuration. Different from the embodiment of FIG. 1A, the foldable input apparatus of FIG. 8 includes only the first input part 210, the first housing 310, and the connection part 100, which connects to an electronic device 600.

Although specific embodiments have been illustrated and described, it will be obvious to those skilled in the art that various modifications may be made without departing from what is intended to be limited solely by the appended claims.

What is claimed is:

1. A foldable input apparatus, comprising:
   a connection part comprising a first pivot and a second pivot, said first pivot being distanced from said second pivot by a constant first vertical distance and a constant first horizontal distance smaller than said first vertical distance;
   a first housing pivotally connecting to said first pivot, said first housing defining a first axis, said first axis being parallel with said first housing and passing through said first pivot; and
   a first input part movably disposed on said first housing, said first input part pivotally connecting to said second pivot, said first input part defining a second axis, said second axis being parallel with said first input part and passing through said second pivot, said first axis being away from said second axis by a first distance;
   wherein said first input part and said first housing are selectively in a closed configuration and an open configuration when said first input part and said first housing rotate toward a same direction with respect to said connection part, said first distance substantially equals said first horizontal distance when said first input part and said first housing are in said closed configuration, and said first distance equals said first vertical distance when said first input part and said first housing are in said open configuration.

2. The foldable input apparatus of claim 1, wherein said first input part is substantially accommodated in said first housing.

3. The foldable input apparatus of claim 1, wherein said first input part is substantially parallel to said first housing.

4. The foldable input apparatus of claim 1, wherein a relative position of said first input part and said first housing perpendicular to said first input part is changed when said first input part and said first housing rotate with respect to said connection part.

5. The foldable input apparatus of claim 1, wherein a relative position of said first input part and said first housing parallel to said first input part is changed when said first input part and said first housing rotate with respect to said connection part.

6. The foldable input apparatus of claim 1, wherein said first input part and said first housing move in response to each other.

7. The foldable input apparatus of claim 1, wherein said connection part further includes a third pivot and a fourth pivot positioned on the same side as said first and second pivots respectively, said third pivot being distanced from said fourth pivot by a second vertical distance and a second horizontal distance smaller than said second vertical distance; said foldable input apparatus further comprises:
a second housing pivotally connecting to said third pivot, said second housing defining a third axis passing through said third pivot; and
a second input part movably disposed on said second housing, said second input part pivotally connecting to said fourth pivot, said second input part defining a fourth axis passing through said fourth pivot, said third axis being away from said fourth axis by a second distance;
wherein said second input part and said second housing are selectively in a closed configuration and an open configuration when said second input part and said second housing rotate with respect to said connection part, said second distance substantially equals said second horizontal distance when said second input part and said second housing are in said closed configuration, and said second distance equals said second vertical distance when said second input part and said second housing are in said open configuration.

8. The foldable input apparatus of claim 7, wherein said first input part partially overlaps said second input part and said first and second input parts are positioned between said first and second housings when said first input part, said first housing, said second input part, and said second housing are in said closed configuration respectively.

9. The foldable input apparatus of claim 7, wherein said first and second input parts are coplanar and edges of said first and second input parts are substantially complementary to each other when said first input part, said first housing, said second input part, and said second housing are in said open configuration respectively.

10. The foldable input apparatus of claim 1, wherein said first input part has a bottom surface with at least one hole therein, and said first housing has an upper surface with at least one protrusion thereon, said protrusion is accommodated in said hole when said first input part and said first housing are in said closed configuration, and said protrusion escapes from said hole touching against said bottom surface of said first input part when said first input part and said first housing are in said open configuration.

11. The foldable input apparatus of claim 1, wherein said first input part has a bottom surface with at least one protrusion thereon, and said first housing has an upper surface with at least one hole therein, said protrusion is accommodated in said hole when said first input part and said first housing are in said closed configuration, and said protrusion escapes from said hole touching against said upper surface of said first housing when said first input part and said first housing are in said open configuration.

12. The foldable input apparatus of claim 7, further comprising a locking device, wherein said locking device maintains a relative position of said first and second housings unchanged when said first and second housings are in said open configuration respectively.

13. The foldable input apparatus of claim 1, wherein said first input part includes a keyboard module.

14. The foldable input apparatus of claim 1, wherein said first input part includes a touch pad module.

15. A foldable input apparatus, comprising:
a connection part;
an input part pivotally connecting to said connection part, said input part having a bottom surface with at least one hole therein; and
a housing pivotally connecting to said connection part, said housing having an upper surface with at least one protrusion thereon;
wherein said input part and said housing are selectively in a closed configuration and an open configuration when said input part and said housing rotate toward a same direction with respect to said connection part, said at least one protrusion is accommodated in said at least one hole when said input part and said housing are in said closed configuration, and said at least one protrusion escapes from said at least one hole touching against said bottom surface of said input part when said input part and said housing are in said open configuration.

16. The foldable input apparatus of claim 15, wherein:
said connection part comprises a first pivot and a second pivot, said first pivot being distanced from said second pivot by a vertical distance and a horizontal distance smaller than said vertical distance;
said housing pivotally connects to said first pivot, said housing defines a first axis passing through said first pivot; and
said input part is movably disposed on said housing and pivotally connects to said second pivot, said input part defines a second axis passing through said second pivot, said first axis being away from said second axis by a distance;
wherein said input part and said housing are selectively in a closed configuration and an open configuration when said input part and said housing rotate with respect to said connection part, said distance substantially equals said horizontal distance when said input part and said housing are in said closed configuration, and said distance equals said vertical distance when said input part and said housing are in said open configuration.

17. A foldable input apparatus, comprising:
a connection part;

an input part pivotally connecting to said connection part, said input part having a bottom surface with at least one protrusion thereon; and a housing pivotally connecting to said connection part, said housing having an upper surface with at least one hole therein;

wherein said input part and said housing are selectively in a closed configuration and an open configuration when said input part and said housing rotate toward a same direction with respect to said connection part, said at least one protrusion is accommodated in said at least one hole when said input part and said housing are in said closed configuration, and said at least one protrusion escapes from said at least one hole touching against said upper surface of said housing when said input part and said housing are in said open configuration.

18. The foldable input apparatus of claim 17, wherein:

said connection part comprises a first pivot and a second pivot, said first pivot being distanced from said second pivot by a vertical distance and a horizontal distance smaller than said vertical distance;

said housing pivotally connects to said first pivot, said housing defines a first axis passing through said first pivot; and said input part is movably disposed on said housing and pivotally connects to said second pivot, said input part defines a second axis passing through said second pivot, said first axis being away from said second axis by a distance;

wherein said input part and said housing are selectively in a closed configuration and an open configuration when said input part and said housing rotate with respect to said connection part, said distance substantially equals said horizontal distance when said input part and said housing are in said closed configuration, and said distance equals said vertical distance when said input part and said housing are in said open configuration.

* * * * *